United States Patent [19]

Bliss

[11] Patent Number: 4,844,553
[45] Date of Patent: Jul. 4, 1989

[54] DASH CONTROL VALVE WITH DIFFERENTIAL TRIP

[75] Inventor: Joseph A. Bliss, Cleveland, Ohio

[73] Assignee: Allied-Signal Inc., Morristown, N.J.

[21] Appl. No.: 211,653

[22] Filed: Jun. 27, 1988

[51] Int. Cl.4 ............................................. B60T 13/00
[52] U.S. Cl. .................... 303/7; 137/625.26; 137/625.49; 303/50; 303/71
[58] Field of Search ............... 303/71, 50–56, 303/7, 8, 9, 9.76, 63, 64, 28, 29, 30, 6.01, 9.61, 9.66; 137/627.5, 625.26, 625.49, 625.25, 625.33, 625.37; 188/170

[56] References Cited

U.S. PATENT DOCUMENTS

| 4,163,584 | 8/1979 | Koenig | 303/71 X |
|---|---|---|---|
| 4,232,908 | 11/1980 | Stearns | 303/71 X |
| 4,307,917 | 12/1981 | Hasselbacher et al. | 303/71 |
| 4,330,157 | 5/1982 | Sebo | 303/7 |
| 4,629,256 | 12/1986 | Fannin | 303/9.76 X |
| 4,657,311 | 4/1987 | Fannin | 303/71 |
| 4,691,737 | 8/1987 | Sebo | 137/625.26 |

Primary Examiner—Douglas C. Butler
Attorney, Agent, or Firm—Ken C. Decker; William N. Antonis

[57] ABSTRACT

A control valve for a fluid pressure braking system includes a housing which receives a pair of identical plungers and corresponding springs acting on the plunger which activate automatically at different trip pressures. The differential trip pressures are attained by providing different valve seating areas on the housing and spring cavities of different depths.

15 Claims, 1 Drawing Sheet

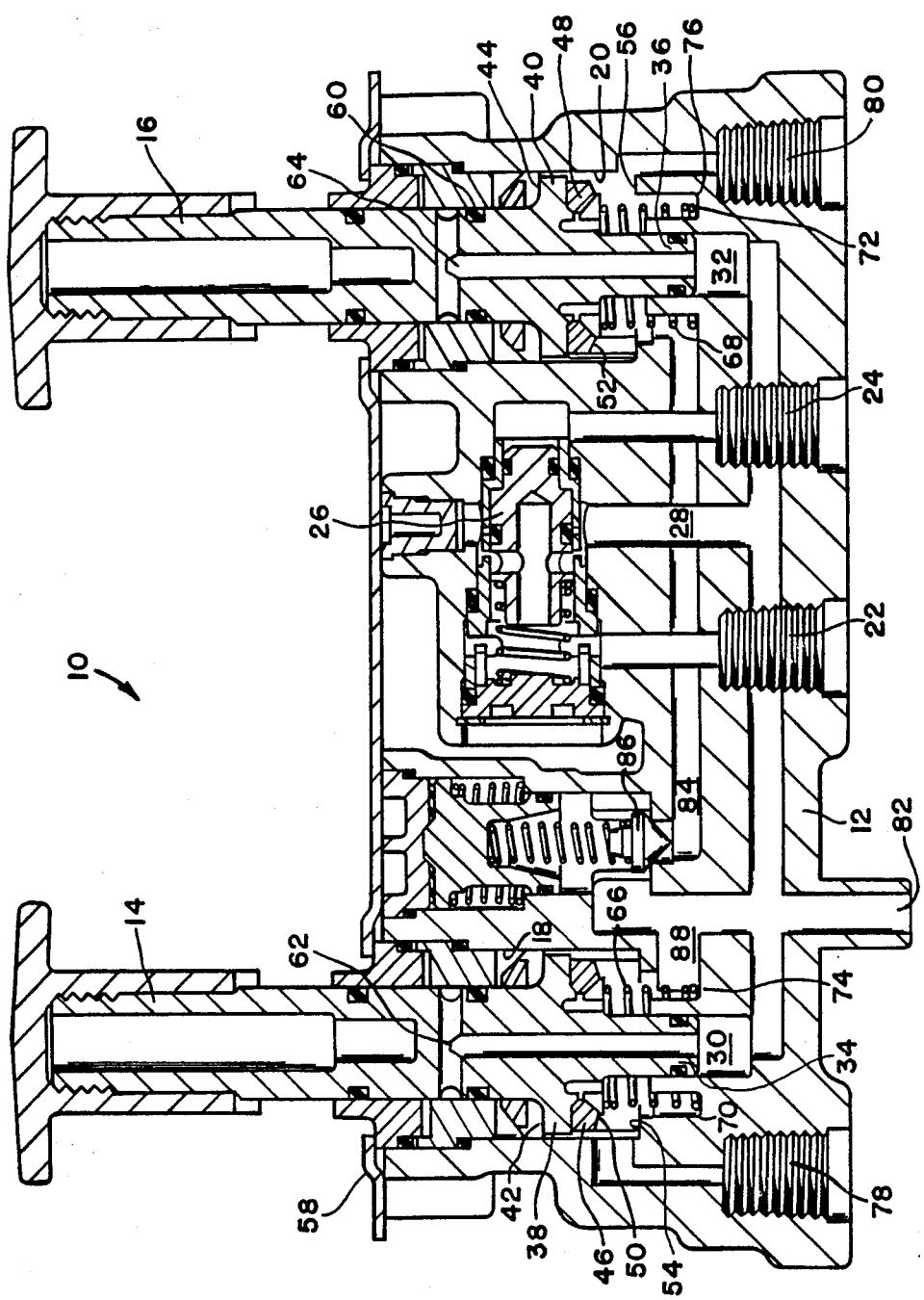

DASH CONTROL VALVE WITH DIFFERENTIAL TRIP

This invention relates to a control valve for a fluid pressure braking system.

Air brake systems for tractor-trailer combination vehicles require an operator actuated, dash mounted control valve for controlling the parking/emergency brakes on the combination vehicle. Such vehicles are normally equipped with a parking/emergency system in which tandem spring brake actuators are maintained in a released condition by a hold-off pressure controlled by the aforementioned control valve. Therefore, the parking/emergency brakes are automatically applied if the hold-off pressure is vented.

The control valve includes a pair of valve plungers which are operated by the vehicle operator. One of the plungers controls cummunication to the trailer parking/emergency system, and can close off communication to that system if the tractor is operated in the bobtail mode. The other plunger operates the parking/emergency brakes on both the tractor and trailer and is used to provide "system park" capabilities, that is, operation of this plunger simultaneously applies the parking/emergency brakes on both the tractor and the trailer. Such a prior art valve is disclosed in U.S. Pat. No. 4,330,157.

Federal regulations require that the control valves "trip", that is, that they automatically apply the parking/emergency brakes that they control, in case the pressure level in the system drops below a predetermined safe operating level. Industry practice further dictates that the trailer brakes be applied before (that is, at a higher pressure level) the parking/emergency brakes of the tractor are applied. For example, a trailer application normally is designed to occur whenever the supply pressure drops below a pressure in the range from 35 psi to 45 psi, and the automatic parking/emergency application for the entire vehicle occurs when the pressure drops to a pressure level in the range from 20-30 psi.

Although the plungers used in prior art control valves appear to be identical, they and their associated springs must be slightly different in order to maintain the differential between the trip pressures. Accordingly, tooling for two separate plungers had to be obtained and the different components accounted for when the valve is manufactured, and a mechanic must be extremely careful that the plungers are not reversed when the valve is repaired. The present invention provides a two plunger brake control valve in which both plungers are identical, and the springs used with the plungers are also identical. The difference in trip pressures is effected as will be described hereinafter by changes in the valve housing. Accordingly, the parking brakes on the tractor will always be applied at a predetermined pressure differential below the point at which the trailer parking brakes are applied, and, since the plungers and springs are identical, they may be interchanged.

These and other advantages of the present invention will become apparent from the following description, with reference to the accompanying drawings, the sole FIGURE of which is a cross-sectional view of a control valve made pursuant to the teachings of the present invention.

Referring now to the drawing, a control valve generally indicated by the numeral 10 includes a valve housing 12 which slidably receives plungers 14, 16. As discussed above, an important feature of the invention is that the plungers 14, 16 are substantially identical so that they may be interchanged. The plungers 14, 16 are more completely disclosed in U.S. Pat. No. 4,691,737, and will be disclosed in such detail herein only as necessary for an understanding of the present invention. Control valves 14, 16 are slidably received within bore 18, 20 defined within the housing 12.

The housing 12 includes a primary supply port 22 and a secondary supply port 24. Supply ports 22, 24 are connected to corresponding fluid pressure supply circuits of the vehicle compressed air braking system. The supply ports 22, 24 are communicated to opposite ends of a pressure responsive shuttle 26, which is responsive to the pressure differential between the ports 22, 24 to communicate the primary supply port 22 to outlet passage 28 unless the pressure level at secondary supply port 24 exceeds the pressure at primary supply port 22 by more than a predetermined amount. The shuttle is described in detail in the aforementioned U.S. Pat. No. 4,330,157. The outlet passage 28 communicates with inlet sections 30, 32 of the bores 18, 20.

Each of the plungers 14, 16 include a portion 34, 36 which is slidably and sealingly received in the inlet sections 30 and 32 respectively. Each of the plungers 14 and 16 further include a radially projecting section 38, 40. The radially projecting sections 38, 40 define a fluid pressure responsive surface 42, 44 on the plungers 14 and 16 respectively, and the radially projecting sections 38, 40 also carry a circumferentially extending, radially projecting, downwardly extending (viewing the Figure) elastomeric valve element 46, 48. Each of the valve elements 46, 48 defines a radially extending surface 50, 52. As discussed above, an important feature of the invention is that the valve plungers 14, 16 are substantially identical so that they may be interchanged, even though some of the pressure control functions of the plungers 14, 16 may function at different pressure levels. These differential pressure levels are attained by the provision of the radially projecting surfaces 50, 52. These surfaces 50, 52 are adapted to sealingly engage circumferentially extending valve seating areas 54, 56 defined on the bores 18, 20 respectively. Although the plungers 14, 16 are substantially identical, the valve seating areas 54, 56 have different inner diameters, and therefore engage their corresponding surface 50, 52 at radially offset circumferential planes.

As discussed in the aforementioned U.S. Pat. No. 4,691,737, when the plungers 14, 16 are pushed downwardly viewing the Figure to engage the surfaces 50, 52 with their corresponding valve seats 54, 56, corresponding O-ring seals 58, 60 are moved into the larger diameter portion of the bore 20, thereby permitting pressure to communicate from inlet sections 30, 32 through passages 62, 64 within the plungers 14, 16 into the portion of the bores 18, 20 where the pressure is able to act against the corresponding fluid pressure responsive areas 42, 44 respectively. Although the fluid pressure responsive areas 42, 44 are identical since plungers 14, 16 are interchangable, the force due to fluid pressure tending to maintain the plunger in the downward position in which the surfaces 50, 52 remaining sealing engaged with their corresponding valve seats 54, 56 is equal to an effective area equal to the difference between the fluid pressure responsive areas 42, 44 and the diameter of the opening defined by their corresponding valve seats 54, 56. Since the diameter of valve seat 56 is greater than the diameter of valve seat 54, the unbalanced area associated with the plunger 14 will be less than the corresponding area associated with the plunger 16.

The force tending to hold the plungers 14, 16 in sealing engagement with their corresponding valve seats 54, 56 is not only a function of the fluid pressure reaction forces discussed above, but is also a function of the spring forces exerted on the plungers 14, 16 by their corresponding return springs 66, 68. As discussed above, an important feature of the invention is that the return springs 66, 68 are identical, so that they are interchangeable. However, the force exerted by the springs 66, 68 on their corresponding plungers 14, 16 is not equal. Since the springs 66, 68 are coiled springs, the forces that they exert on their corresponding plungers is a function of the distance that the springs are deflected when the plungers 14, 16 are moved to positions sealingly engaging the surfaces 50, 52 with their corresponding valve seats 54, 56. Each of the springs 66, 68 is received within a corresponding spring cavity 70, 72. The depth of the cavities 70, 72 are unequal, the cavity 72 is slightly deeper than the cavity 70. Since the springs 66, 68 are located between the ends 74, 76 of their corresponding cavities and their corresponding surfaces on the plungers 14, 16, the amount the springs 66, 68 are deflected when the surfaces 50, 52 are brought into sealing engagement with their valve seats 54, 56 will be unequal. Since the spring 66 will be compressed slightly more than spring 68 since the depth of the spring cavity is less than that of the spring cavity 72, the force exerted by the spring 66 will be slightly greater than the force exerted on plunger 16 by the spring 68.

Housing 12 further includes an outlet port 78 which is connected to the trailer parking/emergency system, and another outlet port 80 which is connected to the tractor parking/emergency system. The outlet port 78 is cummunicated with bore 18, and the outlet port 80 is communicated with the bore 20. Bore 20 is also communicated to an exhaust port 82 which is communicated to ambient atmosphere through exhaust passage 84 and a one-way check valve 86. The bore 18 is communicated to exhaust port 82 through exhaust passage 88. As more completely described in the aforementioned U.S. Pat. No. 4,330,157, the check valve 86 permits high pressure air being exhausted from the bore 20 to the exhaust port 82 to communicate to the bore 18 and thereby urge the plunger 14 upwardly into the position shown, thereby effecting a trailer brake application whenever the plunger 16 is pulled. However, when the plunger 14 is moved into the position illustrated, the high pressure air cannot flow back through the channel 84 to trip the plunger 16, because of the check valve 86.

In the position shown, the plunger 16 in its uppermost position illustrated communicates the bore 20, which is communicated to the outlet port 80, to the exhaust port 82. Similarly, the plunger 14 permits communication from the outlet port 78 through the bore 18 to the exhaust passage 88 and exhaust port 82. Accordingly, both the trailer and the tractor emergency/parking brakes will be applied since the aforementioned hold-off pressure is vented to the exhaust port 82, since both plungers 14, 16 are in their uppermost positions. When the vehicle is to be moved, both the plungers 14 and 16 are pushed downwardly viewing the FIGURE, thereby engaging their corresponding surfaces 50, 52 with the corresponding valve seats 54, 56. Accordingly, supply pressure from passage 28 is communicated into the bores 18, 20 through passages 62, 64. Of course, this supply pressure communicated to the bores 18, 20 will also be communicated through the outlet port 78, 80, thereby supplying hold-off pressure to the spring brakes to effect release of the brakes on both the tractor and trailer, thereby permitting the vehicle to be moved. As discussed above, when the vehicle is parked, the plunger 16 may be pulled upwardly viewing the FIGURE, thereby venting the outlet port 80 to the exhaust port 82, and this will also cause the plunger 14 to automatically move out, thereby communicating the outlet port 78 to the exhaust port 82. Accordingly, the parking/emergency brakes of the both the tractor and trailer are applied simultaneously by operation of the plunger 16. Of course, the trailer brakes alone may be applied by operation of the plunger 14 and the tractor brakes will remain released, since the plunger 16 remains pushed in its downward position.

An important safety feature is that whenever the pressure in the bores 18, 20 drop below a predetermined trip pressure, that the plungers 14, 16 automatically "pop out", into the positions illustrated in the drawing, thereby effecting an automatic application of the parking/emergency brakes due to the loss in pressure. However, for vehicle stability and safety reasons, it is necessary that the tractor brakes be applied after (that is, at a lower trip pressure) the brakes of the trailer are applied. As discussed above, the effective area against which fluid pressure acts on the plunger 14 tending to hold the valve surface 50 against the seat 54 is slightly less than the corresponding area of plunger 16, and the force exerted by the spring 66 on the plunger 14 is slightly greater than the force exerted on the plunger 16 by the spring 68. Accordingly, the plunger 14 will pop out at a higher pressure level than will the plunger 16, even though the plungers 14, 16 are substantially identical such that they may be interchanged.

The benefit of using the common valve springs and valve plungers results in an assembly which may be manufactured more economically than prior art assemblies, because of the resulting saving in tooling and because only a single plunger component needs to be inventoried. Furthermore, the valve 10 is obviously easier to assembly than the prior valves of equivalent performance since the operator assembling the valve need not keep track of two plungers which, while they appear almost identical to the naked eye, must not be interchanged. Servicing the valve in the field is also simplified because the mechanic repairing the valve cannot degrade the valve performance by switching plungers. Furthermore, the interchangeable plungers and springs and the differences in the valve seat diameter and spring cavity depth always assures that the trailer brakes will be applied at a predetermined pressure differential below that of the trailer brakes. This permits the full tolerance on the trip pressure range to be used, thereby resulting in fewer manufacturing rejects.

I claim:

1. Control valve for a fluid pressure system comprising a pair of valve assemblies, each of said valve assemblies incuding a valve plunger, each of said valve plungers being slidably received within a corresponding bore of a housing, each of said bores defining a valve seating area for engagement by a corresponding plunger, each of said plungers being movable toward and away from an engaged condition sealingly engaging the corresponding valve seating area, a pair of springs, each of said plungers being urged away from said engaged condition by a corresponding one of said springs and each such plunger having a fluid pressure responsive area opposing its corresponding spring whereby each plunger is maintained in sealing engagement with its corresponding valve seating area in opposition to the force of its corresponding spring as long as the pressure level in the corresponding bore remains above a predetermined trip pressure, the fluid pressure responsive areas of said plungers being equal so that the plungers are interchangable, at least one of said corresponding valve seating areas and corresponding springs cooperating with the fluid pressure responsive areas of the plungers to provide a differential between the trip pressures of the valve assemblies even though the fluid pressure responsive areas are equal.

2. Control valve as claimed in claim 1, wherein said springs are substantially identical such that the springs are interchangable.

3. Control valve as claimed in claim 2, wherein each of said springs is mounted in a spring cavity, each of said springs having a pair of opposite ends, one end of each spring engaging an end of its corresponding spring cavity, the other end of the spring engaging the corresponding valve plunger, whereby the force exerted on the corresponding plunger by its corresponding spring is a function of the distance between the plunger and the end of the spring cavity, said distances being unequal so that the force exerted by each spring on its corresponding plunger is not equal to the force exerted by the other spring on its corresponding plunger.

4. Control valve as claimed in claim 1, wherein each of said valve seating areas cooperates with the fluid pressure responsive area of its corresponding plunger when the corresponding plunger is in the engaged condition to define an unbalanced area responsive to fluid pressure in said bore, the force exerted on said plungers by fluid pressure in said bore when the plungers are in their engaged condition being a function of the unbalanced area, the size of said valve seating areas being unequal so that the force due to fluid pressure acting on one of said plungers is not equal to the force due to fluid pressure acting on the other plunger when the plungers are in their engaged condition and each bore is pressurized to substantially the same pressure level even though the fluid pressure responsive areas of said plungers are substantially the same so that the plungers are interchangable.

5. Control valve as claimed in claim 4, wherein said springs are substantially identical such that the springs are interchangable.

6. Control valve as claimed in claim 5, wherein each of said springs is mounted in a spring cavity, each of said springs having a papir of opposite ends, one end of each spring engaging an end of its corresponding spring cavity, the other end of the spring engaging the corresponding valve plunger, whereby the force exerted on the corresponding plunger by its corresponding spring is a function of the distance between the plunger and the end of the spring cavity, said distances being unequal so that the force exerted by each spring on its corresponding plunger is not equal to the force exerted by the other spring on its corresponding plunger.

7. Control valve as claimed in claim 4, wherein each of said valve plungers carries an elastomeric valve element extending radially with respect to said bore for engagement with the corresponding valve seating area.

8. Control valve as claimed in claim 4, wherein each of said valve seating areas is defined on an annular member circumscribing said bore and defining an aperture, the diameters of said apertures of said valve seating areas being unequal.

9. Control valve as clamed in claim 8, wherein each of said valve plungers carries an annular valve element extending radially with respect to said bore, said valve elements of said valve plungers engaging their corresponding valve seats on circumferentially extending planes offset radialy from the circumferentially extending plane on the other valve element where the other corresponding valve seat is engaged by the other valve element.

10. Control valve for a fluid pressure system comprising a pair of valve assemblies, each of said valve assemblies including a valve plunger, each of said valve plungers being slidably received within a corresponding bore of a housing, each of said bores defining a valve seating area for engagement by a corresponding plunger, each of said plungers being movable toward and away from an engaged condition sealingly engaging the corresponding valve seating area, a pair of substantially identical springs such that said springs are interchangable, each of said plungers being urged away from said engaged condition by a corresponding one of said springs and each such plunger having a fluid pressure responsive area opposing its corresponding spring whereby each plunger is maintained in sealing engagement with its corresponding valve seating area in opposition to the force of its corresponding spring as long as the pressure level in the corresponding bore remains above a predetermined trip pressure, and means for retaining each of said springs within a corresponding bore in a position in which each of said springs is compressed an amount when the corresponding plunger is moved into engagement with its corresponding valve seating area unequal to the compression of the other spring when the other plunger is moved into engagment with its corresponding valve seating area, whereby the substantially identical springs exert substantially different spring forces on their corresponding plungers when the corresponding plungers are engaged with their corresponding valve seating area.

11. Control valve as claimed in claim 10, wherein said retaining means includes a spring cavity, each of said springs having a pair of opposite ends, one end of each spring engaging an end of is corresponding spring cavity, the other end of the spring engaging the corresponding valve plunger, whereby the force exerted on the corresponding plunger by its corresponding spring is a function of the distance between the plunger and the end of the spring cavity, said distances being unequal so that the force exerted by each spring on its corresponding plunger is not equal to the force exerted by the other spring on its corresponding plunger.

12. Control valve for a fluid pressure system comprising a pair of valve assemblies, each of said valve assemblies including a valve plunger, each of said valve plungers being slidably received within a corresponding bore of a housing, each of said bores defining a valve seating area for engagement by a corresponding plunger, each of said plungers being movable toward and away from an engaged condition sealingly engaging the corresponding valve seating area, a pair of springs, each of said plungers being urged away from said engaged condition by a corresponding one of said springs and each such plunger having a fluid pressure responsive area opposing its corresponding spring whereby each plunger is maintained in sealing engagement with its corresponding valve seating area in opposition to the force of its corresponding spring as long as the pressure level in the corresponding bore remains above a predetermined trip pressure, the fluid pressure responsive areas of said plungers being equal so that the plungers are interchangable, each of said valve seating areas cooperating with the fluid pressure responsive area of its corresponding plunger when the corresponding plunger is in the engaged condition to define an unbalanced area responsive to fluid pressure in said bore, the force exerted on said plungers by fluid pressure in said bore when the plungers are in their engaged condition being a function of the unbalanced area, the size of said valve seating areas being unequal so that the force due to fluid pressure acting on one of said plungers is not equal to the force due to fluid pressure acting on the other plunger when the plungers are in their engaged condition and each bore is pressurized to substantially the same pressure level even though the fluid pressure responsive areas of said plungers are substantially the same.

13. Control valve as claimed in claim 12, wherein each of said valve plungers carries an elastomeric valve element extending radially with respect to said bore for engagement with the corresponding valve seating area.

14. Control valve as claimed in claim 12, wherein each of said valve seating areas is defined on an annular member circumscribing said bore and defining an aperture, the diameters of said apertures of said valve seating areas being unequal.

15. Control valve as claimed in claim 14, wherein each of said valve plungers carries an annular valve element extending radially with respect to said bore, said valve elements of said valve plungers engaging their corresponding valve seats on circumferentially extending planes offset radially from the circumferentially extending plane on the other valve member where the other coresponding valve seat is engaged by the other valve element.

* * * * *